US009959782B1

(12) United States Patent
Candelore et al.

(10) Patent No.: US 9,959,782 B1
(45) Date of Patent: May 1, 2018

(54) ACCESSIBILITY REMOTE CONTROL FOR THE BLIND

(71) Applicant: Sony Corporation, Tokyo (JP)

(72) Inventors: Brant Candelore, Escondido, CA (US); Mahyar Nejat, San Diego, CA (US); Peter Shintani, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days. days.

(21) Appl. No.: 15/681,015

(22) Filed: Aug. 18, 2017

(51) Int. Cl.
*G09B 21/00* (2006.01)
*G08C 17/02* (2006.01)

(52) U.S. Cl.
CPC .......... *G09B 21/006* (2013.01); *G08C 17/02* (2013.01)

(58) Field of Classification Search
CPC .............................. G08C 17/02; G09B 21/006
See application file for complete search history.

(56) References Cited

U.S. PATENT DOCUMENTS

| | | | |
|---|---|---|---|
| 4,700,377 A | 10/1987 | Yasuda et al. | |
| 5,327,176 A | 7/1994 | Forler et al. | |
| 5,373,330 A | 12/1994 | Levine | |
| 6,130,624 A | 10/2000 | Guyer | |
| 6,320,621 B1 | 11/2001 | Fu | |
| 6,457,681 B1 * | 10/2002 | Wolf | A63H 19/14 104/296 |
| 8,629,754 B2 | 1/2014 | Schafer et al. | |
| 9,538,251 B2 | 1/2017 | Aravamudan | |
| 9,720,640 B2 | 8/2017 | Pedersen et al. | |
| 9,743,032 B2 * | 8/2017 | Robinson | H04N 5/4403 |
| 2004/0090424 A1 * | 5/2004 | Hurley | G09G 5/00 345/169 |
| 2005/0212685 A1 | 9/2005 | Gordon | |
| 2010/0060505 A1 * | 3/2010 | Witkowski | G08C 17/02 341/176 |
| 2010/0235745 A1 | 9/2010 | Shintani | |
| 2010/0286653 A1 | 11/2010 | Kubel et al. | |
| 2011/0140847 A1 | 6/2011 | Schafer et al. | |
| 2013/0073998 A1 | 3/2013 | Migos et al. | |

(Continued)

FOREIGN PATENT DOCUMENTS

| | | |
|---|---|---|
| CN | 202872895 U | 4/2013 |
| KR | 20000061853 A | 10/2000 |

OTHER PUBLICATIONS

Brant Candelore, Mahyar Nejat, Peter Shintani, "Accessibility Menu From Remote Control", related pending U.S. Appl. No. 15/631,791, filed Jun. 23, 2017.

(Continued)

*Primary Examiner* — Carlos E Garcia
(74) *Attorney, Agent, or Firm* — John L. Rogitz

(57) ABSTRACT

A remotely controlled device receives a command from a remote control (RC) but does not execute the command. Instead, the remotely controlled device accesses an audio file pertaining to the command and announces what the command is, so that a vision-impaired person can hear the command caused by the key that was just pressed. If the person wishes the command to be executed, he presses the key again within a threshold period. In another embodiment, the RC receives a press of a key but does not send the associated command. Instead, the RC announces the command. If the user wishes to send the command to a remotely controlled device, he presses the key again.

16 Claims, 4 Drawing Sheets

(56) References Cited

U.S. PATENT DOCUMENTS

2014/0111315 A1\* 4/2014 Geerlings .......... G07C 9/00309
340/12.5
2014/0160362 A1 6/2014 Shintani et al.
2017/0235412 A1 8/2017 Cheong

OTHER PUBLICATIONS

Brant Candelore, Mahyar Nejat, Peter Shintani, "Accessibility Remote Control for the Blind", related U.S. Appl. No. 15/681,015, Non-Final Office Action dated Dec. 14, 2017.
"X1—TV is universal. Access should be as well." Retrieved on Nov. 15, 2017 from https://www.xfinity.com/accessibility.
Brant Candelore, Mahyar Nejat, Peter Shintani, "Accessibility Remote Control for the Blind", file history of related U.S. Appl. No. 15/893,370, filed Feb. 9, 2018.
Brant Candelore, Mahyar Nejat, Peter Shintani, "Accessibility Menu from Remote Control", related U.S. Appl. No. 15/631,791, Non-Final Office Action dated Feb. 23, 2018.

\* cited by examiner

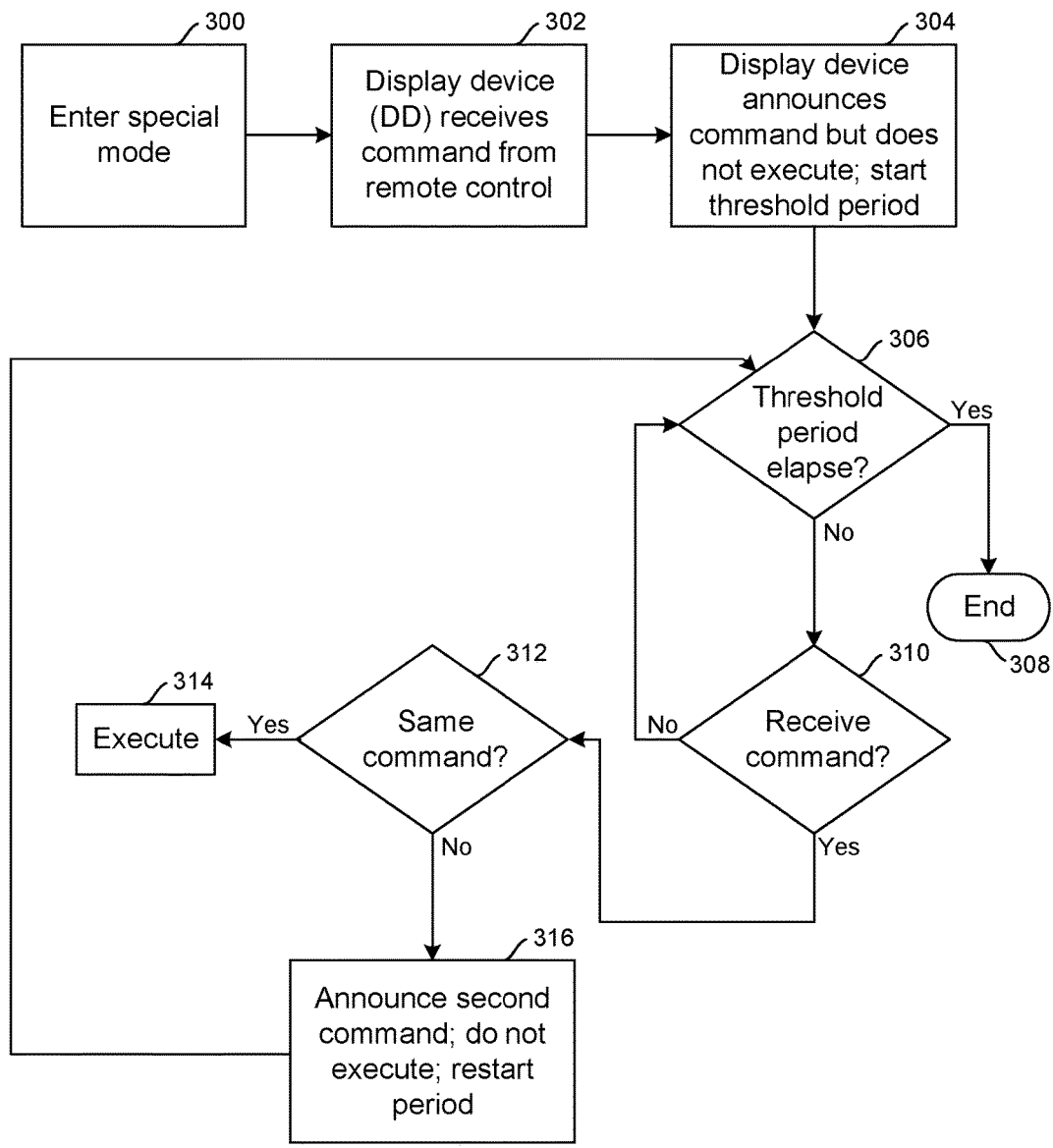
FIG. 3  Display device - centric

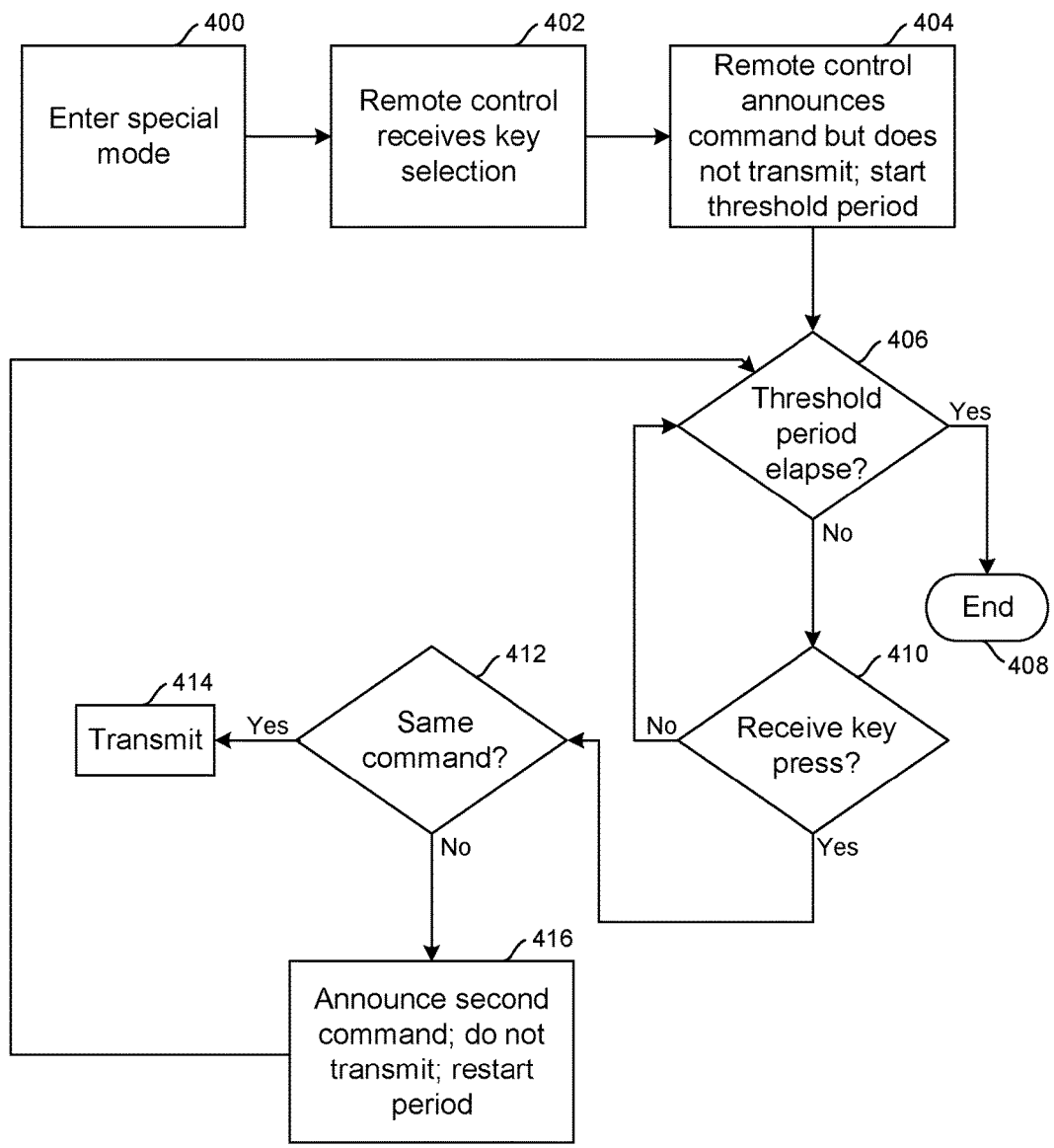
FIG. 4 Remote control - centric

ACCESSIBILITY REMOTE CONTROL FOR THE BLIND

FIELD

The present application relates to technically inventive, non-routine solutions that are necessarily rooted in computer technology and that produce concrete technical improvements.

BACKGROUND

A typical rectangular remote control (RC) may have dozens of buttons, e.g., up to 50 or more. Furthermore, RCs have no real standardization. Consequently, the blind must learn what each button is and where it is located on the remote control or smart screen of a mobile device. When the RC has dozens of keys, then this can be very daunting.

SUMMARY

Present principles recognize the above problems and so provide a display device such as a TV and a remote control (RC) configured to send wireless commands to the display device. In an example, a special mode can be entered by pressing one or more special keys such as the volume up and volume down keys at the same time, or a special accessibility key. Regardless, any of the keys on the RC can be pressed with respective commands sent to the display device, which does not execute the command. Instead, the display device announces the name of the key or associated command. Then, if the user presses the key again within a threshold period, the display device receives the repeated command and executes it. For instance, of a "TV select" key is pressed, the display device announces "TV" but does not otherwise switch input to the TV. If the "TV select" key is pressed again within a threshold period, e.g., two seconds, then the display device will switch input to broadcast TV. However, if the user does not press the same key within the threshold period, then no command is executed. If a second, different key is pressed, the key (or its command) is announced by the display device, but the command is not executed.

In another embodiment, the RC announces the name or command of a selected key but does not send a wireless command to the display device unless the key is selected a second time within a threshold period.

Accordingly, a system includes a display device (DD) configured to receive wireless commands from a remote control (RC). At least one circuit in the DD is configured to receive from the RC a first command. The circuitry is configured to play on at least one speaker of the DD an audible indication of the first command but not execute the first command, and responsive to receiving the first command a second time from the RC within a threshold period, execute the first command. The circuitry is configured to, responsive to not receiving the first command a second time from the RC within the threshold period, not execute the first command. The circuitry is further configured to, responsive to receiving the first command a second time from the RC after elapse of the threshold period, play on at least one speaker of the DD an audible indication of the first command but not execute the first command.

In some examples, the circuitry is configured for playing on the at least one speaker of the DD the audible indication of the first command but not executing the first command only responsive to being configured in a training mode. The circuitry can be configured for configuring the DD in the training mode responsive to selection of a special key on the RC, and/or responsive to selection of plural keys.

In some example embodiments, the circuitry may be configured for receiving, within the threshold period, a second command different from the first command. The circuitry can be configured for, responsive to receiving the second command, announcing the second command but not executing the first or second command, and responsive to receiving the second command, restarting the threshold period.

In another aspect, a system includes a remote control (RC) with plural keys selectable to cause the RC to send respective wireless commands from a wireless transceiver of the RC to a display device (DD). Circuitry in the RC is configured to receive a selection of a first key, and play on at least one speaker of the RC an audible indication of the first key but not transmit to the DD a command responsive to receiving the selection of the first key. The circuitry also is configured to, responsive to receiving a selection of the first key a second time within a threshold period, transmit a command to the DD corresponding to the first key. The circuitry is further configured to, responsive to not receiving a selection of the first key second time within the threshold period, not transmit to the DD a command corresponding to selection of the first key. Still further, the circuitry can be configured to, responsive to receiving a selection of the first key a second time after elapse of the threshold period, play on at least one speaker of the RC an audible indication of the first key but not transmit to the DD a command corresponding to selection of the first key.

In another aspect, a method includes receiving at a display device (DD) a wireless first command from a remote control (RC), and starting a threshold period responsive to receiving the first command but not executing the first command unless the first command is received a second time prior to elapse of the threshold period.

The details of the present disclosure, both as to its structure and operation, can be best understood in reference to the accompanying drawings, in which like reference numerals refer to like parts, and in which:

BRIEF DESCRIPTION OF THE DRAWINGS

FIGS. 3 and 4 are flow charts illustrating example logic consistent with present principles.

DETAILED DESCRIPTION

Figure 1:
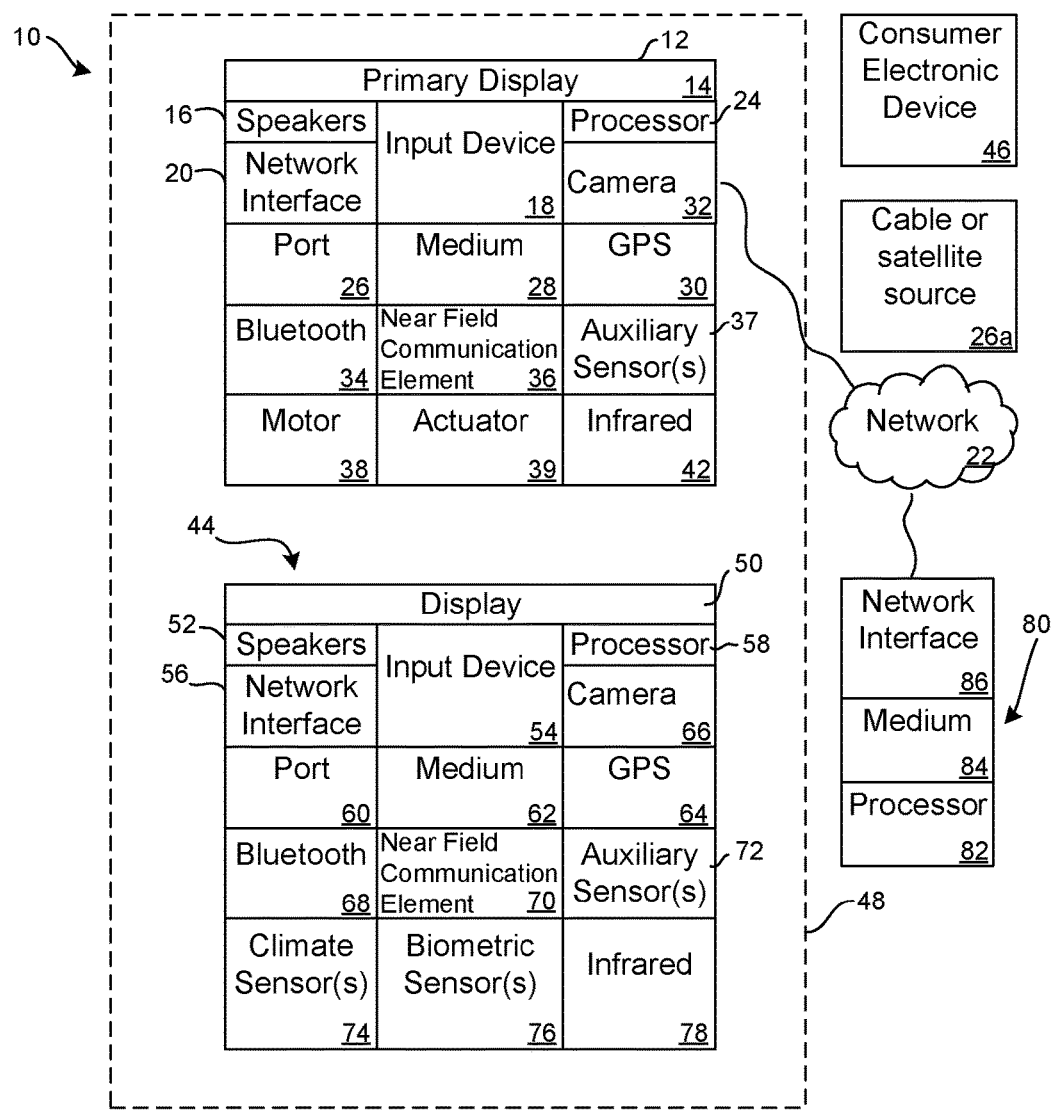
FIG. 1 is a block diagram of an example system including an example in consistent with present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or "8K" (or higher resolution) flat screen and that may be touch-enabled for receiving consumer input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a consumer through the headphones. The AVDD 12 may further include one or more computer memories 28 that are not transitory signals, such as disk-based or solid-state storage (including but not limited to flash memory). Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., in a home, or at least to be present in proximity to each other in a location such as a house. However, for illustrating present principles the first CE device 44 is assumed to be in the same room as the AVDD 12, bounded by walls illustrated by dashed lines 48.

The example non-limiting first CE device 44 may be established by any one of the above-mentioned devices, for example, a portable wireless laptop computer or notebook computer, and accordingly may have one or more of the components described below. The second CE device 46 without limitation may be established by a wireless telephone. The second CE device 46 may implement a portable hand-held remote control (RC).

The first CE device 44 may include one or more displays 50 that may be touch-enabled for receiving consumer input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 may control the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device and/or a headphone port to connect headphones to the first CE device 44 for presentation of audio from the first CE device 44 to a consumer through the headphones. The first CE device 44 may further include one or more computer memories 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44.

The second CE device 46 may include some or all of the components shown for the CE device 44.

Now in reference to the afore-mentioned at least one server 80, it includes at least one server processor 82, at least one computer memory 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
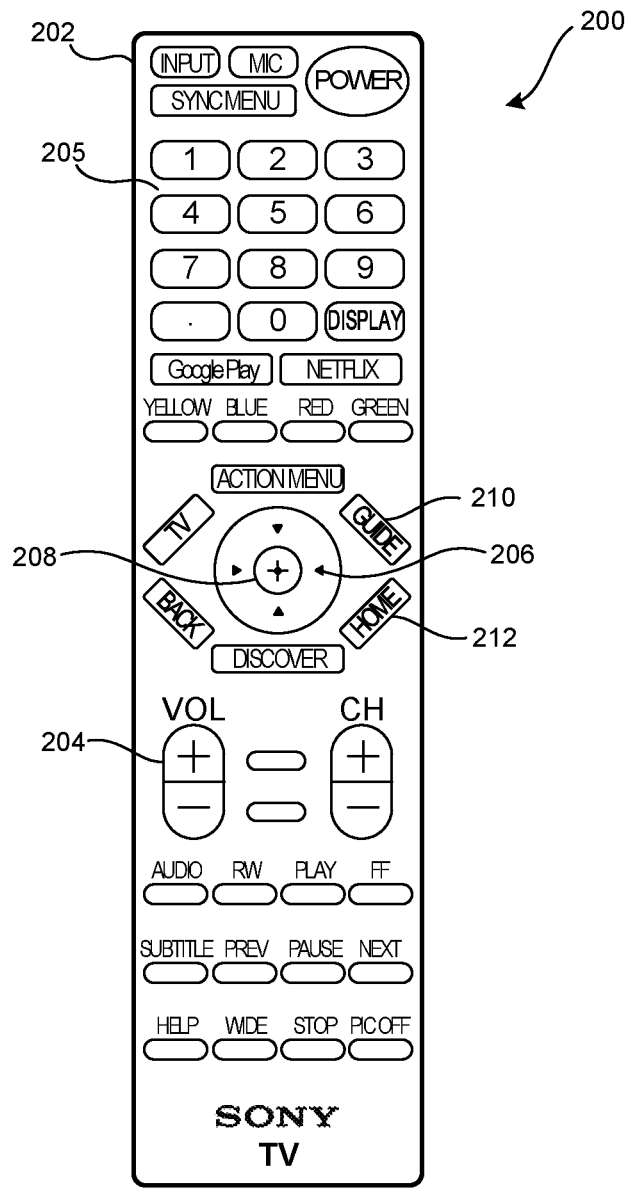
FIG. 2 is a plan view of an example remote control (RC) consistent with present principles.

FIG. 2 shows a remote control (RC) 200 that may include appropriate components of the above-described CE device 44 or 46. Thus, the RC 200 may include one or more internal processors, computer memories, and wireless transmitters such as IR command transmitters to control a device such as the AVDD 12.

As shown, the RC 200 includes a typically plastic, hand-holdable housing 202 with multiple input keys that can be manipulated by a person to cause wireless commands to be sent from the RC 200 to, e.g., the AVDD 12. For example, volume up and down keys 204 may be manipulated to respectively turn the volume of the speakers of the AVDD 12 up and down. An alpha-numeric keypad 205 may be provided on the RC 200 for inputting letters and/or numbers to the AVDD 12. Also, a directional input element such as a rocker 206 or directional keys may be provided with each arm of the rocker being manipulable to move a screen cursor up and down and left and right. If desired, a select key 208 may be located in the center of the rocker 206 for input of a "select" command.

Further, in the example shown the RC 200 may include a guide key 210 manipulable to send a command to present an electronic program guide (EPG) on the AVDD 12. Also, a home key 212 may be provided and can be manipulated to invoke a home menu. A special accessibility key may be provided. As shown, many other keys also may be provided, making the task for a blind person to learn the functions of the keys daunting.

FIG. 3 illustrates logic that may be executed by a display device (DD) such as the AVDD 12 shown in FIG. 1. While FIGS. 3 and 4 are shown in flow chart format for description, it is to be understood that state logic equivalently may be used.

Commencing at block 300, if desired a special training mode may be entered. The mode may be entered by receiving a command from an RC such as the RC 200 generated by a selection of a special key such as the accessibility key, or generated by selection of a predetermined sequence of conventional keys, such as the simultaneous press of two keys or sequential press of the first two keys in the top row of the RC, or other pattern. In some embodiments entry into special mode may be dispensed with and the ensuing logic always performed.

Moving to block 302, the DD receives a first command from the RC. At block 304 the DD announces (e.g., on one or more of its audio speakers) the command (sometimes referred to as "function") that was received at block 302, but the DD does not execute the command. Instead, a threshold period counter is started.

Proceeding to diamond 306, the DD determines whether the threshold period has elapsed with no further commands being received. If the period has elapsed, the logic ends at state 308 without executing the command.

On the other hand, if the threshold period has not yet elapsed, the logic moves to decision diamond 310, which represents another command being received (if no other command is received the logic conceptually loops between diamonds 306 and 310 until the threshold period elapses, it being understood that state logic is encompassed in this description as well). If the command received at diamond 310 is determined to be the same (first) command at decision diamond 312, the first command is executed at block 314. On the other hand, if the command received at decision diamond 310 is determined not to be the first command but rather to be a different, second command, the second command is announced by the DD at block 316 but not executed. The threshold period is restarted, and the logic then loops back to decision diamond 306 to operate as described above in the case of the first command, except that this time the "same" command tested for should the logic reach decision diamond 312 once again would be the second command. The logic may thus loop iteratively, successively announcing but potentially never executing a series of commands caused by RC key selections, until such time as a command is executed upon reception of a second press of the same key that was initially pressed to commence the threshold period. Note that the DD may access audio files, with each audio file corresponding to a respective one of the keys on the RC, and play the audio file responsive to selection of the associated key.

FIG. 4 illustrates an alternative embodiment in which present principles may be implemented in an RC such as the RC 200. Circuitry such as one or more of the above-described processors/DSPs etc. may be provided in the RC 200 and may be configured to, at block 400, optionally enter a special training. The mode may be entered by receiving a selection of a special key such as the accessibility key, or generated by selection of a predetermined sequence of conventional keys, such as the simultaneous press of two keys or sequential press of the first two keys in the top row of the RC, or other pattern. In some embodiments entry into special mode may be dispensed with and the ensuing logic always performed.

Moving to block 402, the RC receives a first key selection. At block 404 the RC announces (e.g., on one or more of its audio speakers) the command (sometimes referred to as "function") corresponding to the key selection received at block 402, but the RC does not transmit the command to the DD. Instead, a threshold period counter is started.

Proceeding to diamond 406, the RC determines whether the threshold period has elapsed with no further key selections being received. If the period has elapsed, the logic ends at state 408 without transmitting the command.

On the other hand, if the threshold period has not yet elapsed, the logic moves to decision diamond 410, which represents another key selection being received (if no other key selection is received the logic conceptually loops between diamonds 406 and 410 until the threshold period elapses, it being understood that state logic is encompassed in this description as well). If the key selection received at diamond 410 is determined to be the same (first) key selection at decision diamond 412, a first command corresponding to the first key selection is transmitted to the DD at block 414. On the other hand, if the key selection received at decision diamond 410 is determined not to be the first key selection but rather to be a different, second key selection, the command or function represented by the second key that was selected is announced by the RC at block 416 but not transmitted to the DD. The threshold period is restarted, and the logic then loops back to decision diamond 406 to operate as described above in the case of the first key selection, except that this time the "same" key selection tested for should the logic reach decision diamond 412 once again would be the second key selection. The logic may thus loop iteratively, successively announcing a series of key selections but potentially never transmitting a command corresponding to a key selection until such time as a command is transmitted upon reception of a second press of the same key that was initially pressed to commence the threshold period.

While particular techniques are herein shown and described in detail, it is to be understood that the subject matter which is encompassed by the present application is limited only by the claims.

What is claimed is:

1. A system comprising:
   a display device (DD) configured to receive wireless commands from a remote control (RC);
   circuitry in the DD configured to:
   receive from the RC a first command;
   responsive to being in a training mode, play on at least one speaker of the DD an audible indication of the first command but not execute the first command;
   responsive to receiving the first command a second time from the RC within a threshold period, execute the first command;
   responsive to not receiving the first command a second time from the RC within the threshold period, not execute the first command; and
   responsive to receiving the first command a second time from the RC after elapse of the threshold period, play on at least one speaker of the DD another audible indication of the first command but not execute the first command, wherein the circuitry is configured for configuring the DD in the training mode responsive to selection of plural keys.

2. The system of claim 1, wherein the circuitry is configured for playing on the at least one speaker of the DD the audible indication of the first command but not executing the first command only responsive to being configured in the training mode.

3. The system of claim 2, wherein the circuitry is configured for configuring the DD in the training mode responsive to selection of a special key on the RC.

4. The system of claim 1, wherein the circuitry is configured for:
   receiving, within the threshold period, a second command different from the first command;
   responsive to receiving the second command, announcing the second command but not executing the first or second command; and
   responsive to receiving the second command, restarting the threshold period.

5. The system of claim 1, comprising the RC.

6. A system comprising:
   a remote control (RC) with plural keys selectable to cause the RC to send respective wireless commands from a wireless transceiver of the RC to a display device (DD);
   circuitry in the RC configured to:
   receive a selection of a first key;
   play on at least one speaker of the RC an audible indication of the first key but not transmit to the DD a command responsive to receiving the selection of the first key;
   responsive to receiving a selection of the first key a second time within a threshold period, transmit a command to the DD corresponding to the first key;
   responsive to not receiving a selection of the first key second time within the threshold period, not transmit to the DD a command corresponding to selection of the first key;
   responsive to receiving a selection of the first key a second time after elapse of the threshold period, play on at least one speaker of the RC an audible indication of the first key but not transmit to the DD a command corresponding to selection of the first key;
   receiving, within the threshold period, a selection of a second key different from the first key;
   responsive to receiving the selection of the second key, announcing an indication of the second key but not transmitting a command to the DD corresponding to selection of the second key; and
   responsive to receiving the selection of the second key, restarting the threshold period.

7. The system of claim 6, wherein the circuitry is configured for playing on the at least one speaker of the RC the audible indication of the first key but not transmitting a command corresponding to selection of the first key responsive to being configured in a training mode.

8. The system of claim 7, wherein the circuitry is configured for configuring the RC in the training mode responsive to selection of a special key on the RC.

9. The system of claim 7, wherein the circuitry is configured for configuring the RC in the training mode responsive to selection of plural keys.

10. The system of claim 6, comprising the DD.

11. A method, comprising:
    receiving at a display device (DD) a wireless first command from a remote control (RC);
    playing on at least one speaker an audible indication of the first command without further user input;
    starting a threshold period responsive to receiving the first command but not executing the first command unless the first command is received a second time prior to elapse of the threshold period;
    receiving, within the threshold period, a second command different from the first command;
    responsive to receiving the second command, announcing the second command but not executing the first or second command; and
    responsive to receiving the second command, restarting the threshold period.

12. The method of claim 11, comprising playing on at least one speaker an audible indication of the first command upon initial receipt of the first command to start the threshold period.

13. The method of claim 11, comprising responsive to receiving the first command a second time from the RC after elapse of the threshold period, play on at least one speaker an audible indication of the first command but not execute the first command.

14. The method of claim 11, comprising playing an audible indication of the first command but not executing the first command only responsive to being configured in a training mode.

15. The method of claim 14 comprising configuring the training mode responsive to selection of a special key on the RC.

16. The method of claim 14, comprising configuring the training mode responsive to selection of plural keys.

\* \* \* \* \*